United States Patent [19]

Hofmann

[11] Patent Number: 4,627,574

[45] Date of Patent: Dec. 9, 1986

[54] FILTER FOR FUEL INJECTION NOZZLE

[75] Inventor: Karl Hofmann, Remseck, Fed. Rep. of Germany

[73] Assignee: Robert Bosch GmbH, Stuttgart, Fed. Rep. of Germany

[21] Appl. No.: 415,950

[22] Filed: Sep. 8, 1982

[30] Foreign Application Priority Data

Jan. 16, 1982 [DE] Fed. Rep. of Germany ....... 3201218

[51] Int. Cl.$^4$ ................................................ B05B 1/14
[52] U.S. Cl. ................................ 239/590.5; 239/533.3
[58] Field of Search ...................... 239/533.4, 584, 585, 239/590, 590.5; 123/299, 300, 460; 210/446

[56] References Cited

U.S. PATENT DOCUMENTS

| | | | |
|---|---|---|---|
| 1,500,986 | 7/1924 | Fish | 239/590.5 |
| 2,376,292 | 5/1945 | Tabb et al. | 239/533.7 |
| 2,731,299 | 1/1956 | Bramming | 239/590.5 |
| 3,486,700 | 12/1969 | Bristow | 239/590.5 |

FOREIGN PATENT DOCUMENTS 1266725 4/1968 Fed. Rep. of Germany .
2305373 8/1974 Fed. Rep. of Germany .

Primary Examiner—Joseph F. Peters, Jr.
Assistant Examiner—Kevin Patrick Weldon
Attorney, Agent, or Firm—Edwin E. Greigg

[57] ABSTRACT

A fuel injection nozzle for internal combustion engines having a cartridge filter provided with two groups of longitudinal grooves, disposed in a fuel conduit one of which groups of longitudinal grooves originates at one end of the filter while the other group originates at the opposite end of the filter. All longitudinal grooves terminate in a central section of the filter. The fuel conduit and the reduced diameter of the central section of the filter define an annular slit. The longitudinal grooves have a cross-section decreasing over the extent thereof to their termini, so that any excess and harmful amounts of fuel in the filter can be decreased, while maintaining the same external diameter of the filter for purposes of filter replacement in existing fuel injection nozzles.

10 Claims, 5 Drawing Figures

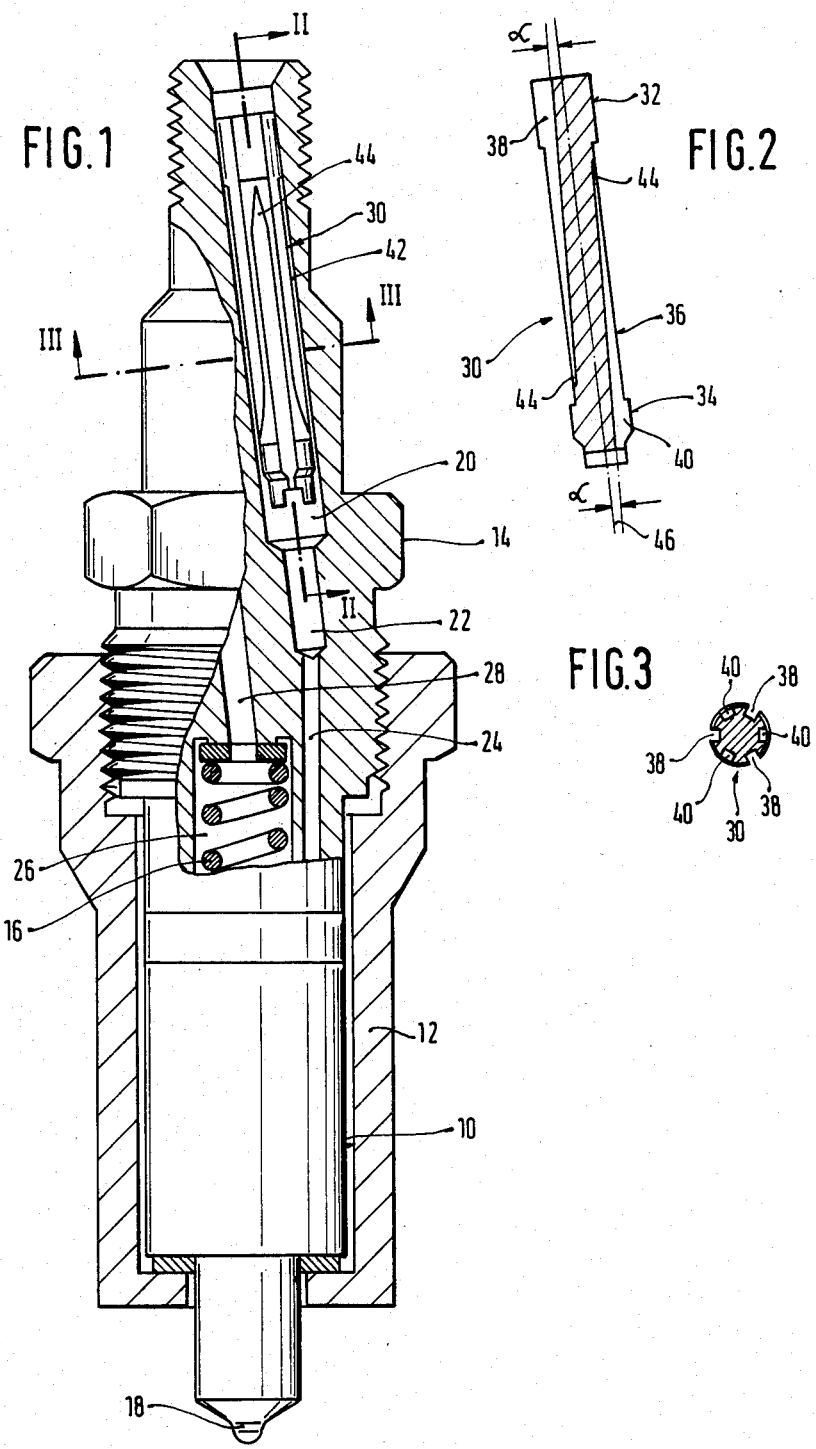

FILTER FOR FUEL INJECTION NOZZLE

BACKGROUND OF THE INVENTION

The invention is based on a fuel injection nozzle having a cartridge filter disposed in the fuel conduit upstream of the ejection orifice. In a known injection nozzle of this type German Offenlegungsschrift No. 23 05 373, longitudinal grooves are provided in the filter which have a constant cross-section over approximately their entire length. Forming the longitudinal grooves in this way results in a comparatively large and harmful amount of fuel in the filter, which should be kept as small as possible in direct injection engines of small output.

OBJECT AND SUMMARY OF THE INVENTION

It is a principal object and advantage of the present invention that the harmful amount of fuel in the filter can be considerably decreased while maintaining the same outer dimensions and the same groove diameters of the cartridge filter. In a working exemplary embodiment it was possible to reduce the harmful amount of fuel from 230 mm$^3$ to 100 mm$^3$ with the development of the longitudinal grooves in accordance with the present invention. By retaining the overall size of present filters, replacements with updated filters becomes easily possible.

It is another object of the invention to reduce the fuel carrying volume of the longitudinal grooves by reducing the depth of the longitudinal grooves over the extent thereof.

It is a further and especially advantageous object of the invention to provide that the longitudinal grooves are disposed in a plane parallel to the longitudinal axis of the filter and in the jacket surface thereof while the base of the groove is at an angle to the longitudinal axis.

The invention will be better understood and further objects and advantages thereof will become more apparent from the ensuing detailed description of the preferred embodiments taken in conjunction with the drawings.

BRIEF DESCRIPTION OF THE DRAWINGS

Two exemplary embodiments of the present invention are shown in the drawings and are explained in more detail in the ensuing description.

FIG. 1 shows an injection nozzle in longitudinal cross section with a filter according to the first exemplary embodiment;

FIG. 2 shows a section through the filter along the line II—II in FIG. 1;

FIG. 3 shows a section through the filter along the line III—III in FIG. 1;

DESCRIPTION OF THE PREFERRED EMBODIMENTS

Figure 4:
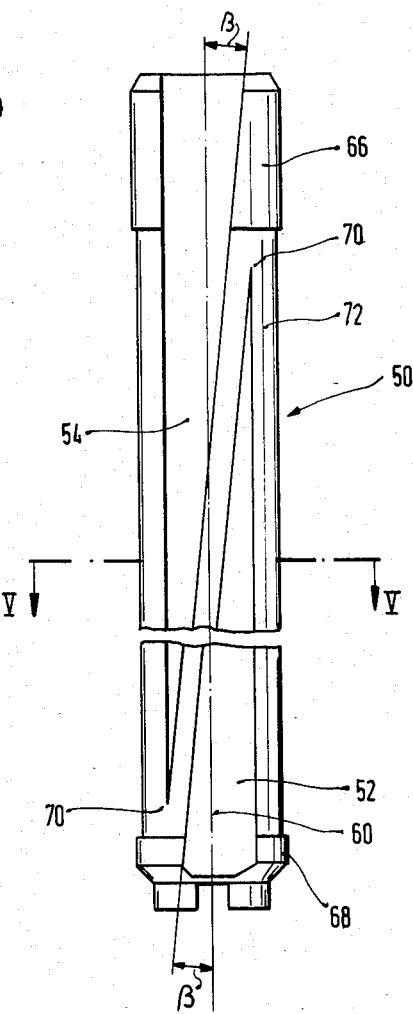
FIG. 4 shows a filter in accordance with the second exemplary embodiment enlarged and in an elevational side view.

The injection nozzle in accordance with FIGS. 1 to 3 has a nozzle body 10, which is fastened to a nozzle holder 14 by means of an adjusting nut 12. The nozzle body 10 contains, as is customery, a valve needle movable against the force of a closing spring 16, which cooperates with a valve seat upstream from the ejection orifice 18 in the nozzle body 10. The nozzle holder 14 contains a fuel supply conduit consisting of three bore sections 20, 22, 24 of different diameters. The bore section 24 is connected with a conduit in the nozzle body 10 ending in a pressure chamber surrounding the valve needle. In the area of the pressure chamber the valve needle is equipped with a pressure shoulder pointing away from the valve seat and the pressure chamber is connected with the valve seat by way of an annular chamber between the valve needle and the bore of the nozzle body 10. The valve needle is displaced by the pressure of the incoming fuel against the force of the closing spring 16, the valve is opened and the fuel reaches the ejection orifices 18. The excess fuel entering the chamber 26 containing the closing spring 16 is conducted by way of a further bore 28 to a fitting, not shown in the drawing, for a connection with a return fuel line.

A filter cartridge 30 is inserted into the bore section 20 of the fuel supply conduit, which forces the inflowing fuel through narrow slits formed between the profiled outer circumference of the filter cartridge 30 and the surrounding wall of the bore section 20. Thus the fuel is filtered and small dirt particles, chips and the like carried along are kept back, starting with a determined size.

Referring to FIG. 2, filter 30 is provided with collars 32, 34 at opposite ends and with a central section 36 of decreased diameter. The collars 32, 34 fit snugly into the bore section 20 in the nozzle holder 24 and maintain the filter 30 in frictional contact with it. The filter 30 is further provided with two groups 38, 40 of longitudinal grooves evenly distributed over the circumference, one group of grooves 38 originating at the collar 32 of the filter 30 and the other group 40 at collar 34. Each group of longitudinal grooves 38, 40 terminates in the central section 36 of the filter 30 short of the opposite collar; encompassing the central section is a narrow annular passage 42, limited by the wall of the bore section 20. The inflowing fuel reaches the annular passage 42 via the first group 38 of longitudinal grooves and proceeds from there via the second group 40 of the longitudinal grooves into the bore section 20, thereby causing the desired filter action.

The longitudinal grooves 38, 40 have a rectangular cross-section and are formed with a tapering extent such that the depth of each groove decreases in the direction of the terminus 44 lying in the central section 36. This is accomplished by disposing the longitudinal grooves 38, 40 in a plane parallel to longitudinal axis 46 of the filter 30 while providing for the base of each groove to taper at an angle α to the longitudinal axis. By means of this taper the harmful amount of fuel in the filter 30 is considerably reduced, while still maintaining the same outer filter dimensions and without significantly increasing the flow-through resistance. If necessary, the arrangement can also be made in such a way that the longitudinal grooves 38, 40 are made shorter than shown in the drawing and end closer to the longitudinal center of the filter 30.

Figure 5:
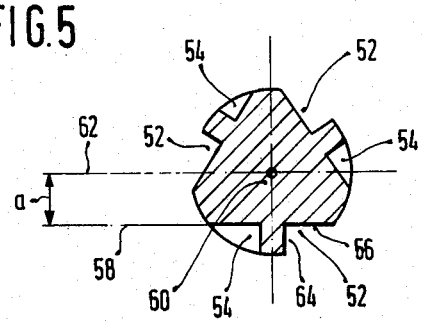
FIG. 5 shows a section along the line V—V in FIG. 4.

In the exemplary embodiment in accordance with FIGS. 4 and 5 a cartridge filter 50 is provided with two groups 52, 54 of longitudinal grooves having a V-shaped cross-section; the grooves are oppositely disposed in adjacent pairs. Each longitudinal groove 52, 54 is disposed in such a way, that one of its sides 56 (FIG. 5) lies in a plane 58 translated at a distance "a" and parallel to a plane 62 through the longitudinal axis 60 of the filter 50. The other side 64 of the adjacent longitudinal grooves 52, 54 extends at a distance parallel to the corresponding side 64 of the associated longitudinal groove 54 or 52 but is disposed at an angle $\beta$ to the longitudinal axis 60 of the filter 50. Through this arrangement the longitudinal grooves 52, 54 disposed in pairs can be milled together in one operation into the filter 50.

The longitudinal grooves 52, 54 end, as in the first exemplary embodiment in a central section 72 of slightly smaller diameter, which is defined at either end by the collars 66, 68 fitted snugly within the fuel supply bore. In this embodiment, too, the fuel is forced to proceed via one group 54 of longitudinal grooves through the annular passage surrounding the central section 72 and from there through the second group 52 of longitudinal grooves, which cause the filter action desired. Because of the inclination of the longitudinal grooves 52, 54, their cross-section reduces to zero, so that, as shown in FIG. 4, the longitudinal extent lying on the circumference of the mantle of the cylindrical section 72 come to a point at the terminus 70. Because of the decreasing cross-section of the longitudinal grooves 52, 54 the harmful amount of fuel is considerably reduced in comparison with grooves having a non-diminishing cross-section, without intolerably increasing the flow-through resistance.

The annular passage 42 between the wall of the bore section 20 and the filter 30 or 50 could also be formed by profiling the bore section 20 accordingly. In this variant filter 30 or 50 could have the same outside diameter along its entire length. The arrangement could also be made in such a way that the bore section 20 as well as the filter 30 or 50 have a gradation of their diameters in order to form the annular passage 42.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A fuel injection nozzle for internal combustion engines comprising a rod-shaped filter body disposed in a fuel inlet conduit upstream of an ejection orifice, said rod-shaped filter body is provided with collars disposed on opposite ends thereof, said collars arranged to fit snugly within said fuel conduit, said rod-shaped filter body is further provided with a central section between said collars which has a uniform diameter which is less than the diameter of each of said collars and forms a mantle surface in which two groups of longitudinal grooves are formed, one of said two groups of longitudinal grooves originating at an outer end of a collar on one end of said filter and the other group of said two groups of longitudinal grooves originating at an outer end of said collar on the opposite end of said filter, each of said groups of longitudinal grooves having an extent and a terminus in said central section, in which the width and depth of each longitudinal groove of each of said groups of longitudinal grooves is formed with a constantly changing cross section which continuously decreases over the entire length of said extent towards said terminus in said central section between said collars, each longitudinal groove of said group of longitudinal grooves includes a straight base line located in a plane which is disposed parallel to and spaced apart by a distance a from a plane through the longitudinal axis of said filter body, and said straight base line of each said longitudinal grooves being disposed at an angle ($\beta$) from the longitudinal axis of the filter body.

2. An injection nozzle as defined by claim 1, characterized in that each longitudinal groove is defined by first and second smooth groove flanks in which said first groove flank is located in a plane disposed parallel to and spaced apart by a distance from a plane through the longitudinal axis of the filter body while said second groove flank extends at the angle ($\beta$) to the longitudinal axis.

3. An injection nozzle as defined by claim 2, characterized in that a respective longitudinal groove beginning at one end is disposed in such a manner with respect to a longitudinal groove beginning at the opposite end that their first groove flanks are located in a common plane and their second groove flanks are located parallel to one another.

4. A fuel injection nozzle for internal combustion engines having a cartridge filter disposed in a fuel inlet conduit, said fuel inlet conduit disposed upstream of an ejection orifice, said cartridge filter provided with collars disposed on opposite ends thereof, said collars arranged to fit snugly within said fuel conduit, said cartridge filter further provided with a central section between said collars which has a uniform diameter which is less than the diameter of each of said collars and having a mantle surface in which two groups of longitudinal grooves are formed, one of said two groups originating at an outer end of a collar on one end of said filter and the other group of said two groups originating at an outer end of said collar on the opposite end of said filter, each of said groups of longitudinal grooves having an extent and a terminus in said central section, in which each longitudinal groove of each of said groups of longitudinal grooves has a base lying in a plane disposed at an angle $\alpha$ to a longitudinal axis of said cartridge filter and is formed with a constantly changing cross section which continuously decreases over the entire length of said extent towards said terminus in said central section between said collars.

5. An injection nozzle in accordance with claim 4, in which a wall of said longitudinal grooves extends in a plane disposed parallel to said longitudinal axis and another wall thereof is disposed at an angle $\beta$ to said longitudinal axis.

6. An injection nozzle in accordance with claim 4, in which each of said longitudinal grooves of said two groups of grooves have a depth which continuously decreases over their extent in said collars and to their terminus.

7. A fuel injection nozzle for internal combustion engines having a cartridge filter disposed in a fuel inlet conduit, said fuel inlet conduit disposed upstream of an ejection orifice, said cartridge filter provided with collars disposed on opposite ends thereof, said collars arranged to fit snugly within said fuel conduit, said cartridge filter further provided with a central section between said collars which has a uniform diameter which is less than the diameter of each of said collars and having a mantle surface in which two groups of longitudinal grooves are formed, one of said two groups originating at an outer end of a collar on one end of said filter and the other group of said two groups originating at an outer end of said collar on the opposite end of said filter, each of said groups of longitudinal grooves having an extent and a terminus in said central section, in which each longitudinal groove of each of said groups of longitudinal grooves is formed with a constantly changing cross section which continuously decreases over the entire length of said extent towards said terminus in said central section between said collars and a wall of said longitudinal grooves extends in a plane disposed parallel to said longitudinal axis and another wall thereof is disposed at an angle $\beta$ to said longitudinal axis.

8. An injection nozzle in accordance with claim 7 in which each of said longitudinal grooves of said two groups of grooves have a depth which continuously decreases over their extent in said collars and to their terminus.

9. An injection nozzle in accordance with claim 7, in which said longitudinal grooves are oppositely disposed in adjacent pairs.

10. An injection nozzle in accordance with claim 9, in which said longitudinal grooves are provided with a V-shaped cross-section and adjacent walls of each pair of grooves are disposed in parallel.

* * * * *